United States Patent
Rosen et al.

(10) Patent No.: US 10,101,773 B2
(45) Date of Patent: Oct. 16, 2018

(54) NON-WOVEN MATERIAL DEVICE COVERING

(71) Applicant: Microsoft Technology Licensing, LLC, Redmond, WA (US)

(72) Inventors: David Ian Rosen, Bellevue, WA (US); Rachael Sara Bell, Seattle, WA (US); James Alec Ishihara, Bellevue, WA (US); Katherine Bailey, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 204 days.

(21) Appl. No.: 15/094,712

(22) Filed: Apr. 8, 2016

(65) Prior Publication Data

US 2017/0293321 A1 Oct. 12, 2017

(51) Int. Cl.
*G06F 1/16* (2006.01)
*B32B 37/00* (2006.01)
(Continued)

(52) U.S. Cl.
CPC ............ *G06F 1/1656* (2013.01); *B29C 63/00* (2013.01); *B29C 63/02* (2013.01); *B32B 37/00* (2013.01);
(Continued)

(58) Field of Classification Search
CPC ...... G06F 1/1656; G06F 1/1662; G06F 1/169; B29C 63/00; B29C 63/02; B29L 2031/3481; B32B 37/00; B44C 1/00
See application file for complete search history.

(56) References Cited

U.S. PATENT DOCUMENTS 3,691,005 A * 9/1972 Butler .................... A47C 7/386
428/81
3,827,930 A * 8/1974 Sutton .................... B05D 1/286
428/91
(Continued)

FOREIGN PATENT DOCUMENTS

CN     102493214 A    6/2012
WO     2002034856 A1  5/2002

OTHER PUBLICATIONS

Perlow, Jason, "Freedomcase: Adjustable case and stand for Microsoft Surface", Published on: Feb. 14, 2014, Available at: http://www.zdnet.com/article/freedomcase-adjustable-case-and-stand-for-microsoft-surface/.

*Primary Examiner* — Francis C Gray
(74) *Attorney, Agent, or Firm* — Alleman Hall Creasman & Tuttle LLP

(57) ABSTRACT

A method of covering a device includes splitting a sheet of non-woven material between a cosmetic surface of the non-woven material and a non-cosmetic surface of the non-woven material. This produces two sheets—a cosmetic sheet of the non-woven material including the cosmetic surface and a first split surface opposite the cosmetic surface, and a non-cosmetic sheet of the non-woven material including the non-cosmetic surface and a second split surface opposite the non-cosmetic surface. The method further includes applying an at least partially transparent coating to the non-cosmetic surface of the non-cosmetic sheet. The first split surface of the cosmetic sheet is affixed to a first portion of the device, and the second split surface of the non-cosmetic sheet is affixed to a second portion of the device.

20 Claims, 7 Drawing Sheets

(51) Int. Cl.
    *B29C 63/00*     (2006.01)
    *B44C 1/00*      (2006.01)
    *B29C 63/02*     (2006.01)
    *B29L 31/34*     (2006.01)

(52) U.S. Cl.
    CPC ............... *B44C 1/00* (2013.01); *G06F 1/169* (2013.01); *G06F 1/1662* (2013.01); *B29L 2031/3481* (2013.01)

(56) References Cited

U.S. PATENT DOCUMENTS

| | | | |
|---|---|---|---|
| 3,978,263 A * | 8/1976 | Wellensiek | B32B 5/16 |
| | | | 442/225 |
| 5,593,769 A | 1/1997 | Wolf et al. | |
| 8,059,384 B2 | 11/2011 | Park et al. | |
| 8,312,991 B2 | 11/2012 | Diebel et al. | |
| 8,390,411 B2 | 3/2013 | Lauder et al. | |
| 8,672,126 B2 | 3/2014 | Rohrbach et al. | |
| 2005/0130542 A1 | 6/2005 | Klein | |
| 2012/0152466 A1* | 6/2012 | Homoelle | B32B 38/0004 |
| | | | 156/718 |
| 2013/0067671 A1 | 3/2013 | Lee | |
| 2013/0227836 A1 | 9/2013 | Whitt et al. | |
| 2013/0271373 A1 | 10/2013 | Milhe et al. | |
| 2014/0036438 A1 | 2/2014 | Gioscia et al. | |
| 2014/0151248 A1 | 6/2014 | Hurst et al. | |
| 2016/0229152 A1* | 8/2016 | Suzuki | B32B 5/24 |

\* cited by examiner

NON-WOVEN MATERIAL DEVICE COVERING

BACKGROUND

Devices may have coverings for protection, performance, and/or aesthetics. Different materials may be used for surfaces of a device to provide different textures, appearances, and other features.

SUMMARY

In one example, a method of covering a device includes splitting a sheet of non-woven material between a cosmetic surface of the non-woven material and a non-cosmetic surface of the non-woven material. This produces two sheets—a cosmetic sheet of the non-woven material including the cosmetic surface and a first split surface opposite the cosmetic surface, and a non-cosmetic sheet of the non-woven material including the non-cosmetic surface and a second split surface opposite the non-cosmetic surface. The example method further includes applying an at least partially transparent coating to the non-cosmetic surface of the non-cosmetic sheet. The first split surface of the cosmetic sheet is affixed to a first side of the device, and the second split surface of the non-cosmetic sheet is affixed to a second side of the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Devices may be subjected to a wide variety of environments and uses. A device may be handled by a user, exposed to varying temperatures, dropped, and/or placed in other environments. Accordingly, devices may be covered with material that is well-suited for a particular environment. For example, smooth, hard surfaces may be used for areas of user input and/or areas exposed to physical forces or water. As another non-limiting example, textured surfaces may be used for surfaces commonly gripped by a user. Coverings may also provide an aesthetic or other appearance-driven quality for the device. However, different types of material often have different appearances. Accordingly, a trade-off currently exists—the selection of different covering materials for providing different tactile experiences or protection levels results in a device having a non-uniform appearance. Conversely, a covering comprising only a single material for uniform appearance may not achieve the tailored performance and/or protection characteristics described above.

Figure 1:
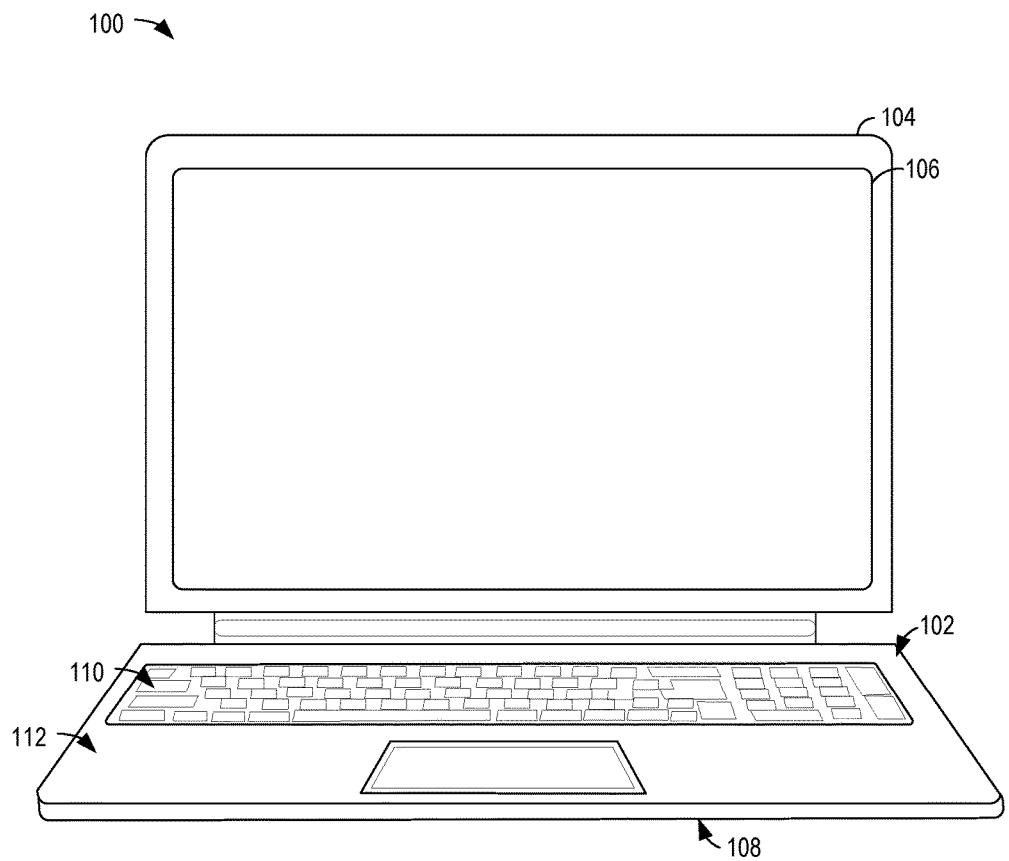
FIG. 1 shows an example device that is covered with non-woven material.

The present disclosure provides methods and covered devices that achieve a balance between a uniform appearance and a tailored tactile experience for different regions of the device. FIG. 1 shows an example device that may be covered as described in the present disclosure. In the non-limiting example of FIG. 1, the device is a mobile computing device 100 including a keyboard 102. However, other devices may be covered as described herein, including gaming controllers, tablets, standalone keyboards or other input devices, wearable computing devices, and/or any other suitable device. In the example of FIG. 1, keyboard 102 may be a detachable keyboard configured to releaseably couple to a tablet 104 to extend the input capabilities of the tablet. Accordingly, keyboard 102 and tablet 104 may be folded such that keyboard 102 also serves as a protective covering for a display 106 of tablet 104. When the keyboard is folded so as to cover display 106, a rear (e.g., bottom, non-input) surface 108 of the keyboard may further provide a gripping surface for portions of a user's hand to securely hold the mobile computing device 100.

Due to the multi-functional nature of keyboard 102 (e.g., as an input device, protective covering, and gripping surface), different regions of the keyboard may benefit from different types of coverings. For example, a user may provide input via the various keys 110 of keyboard 102. In providing input to keys 110, a user may rest his/her palms on a top (e.g., input) surface 112, and slide across the surface to reach different keys. Accordingly, a smooth, hard top surface may prevent the user from experiencing difficulty in sliding across the keyboard to reach the different keys. Furthermore, the input surface may be more prone to water damage, dirt/dust, and general wear and tear. Such a smooth, hard top surface may be easier to clean and may protect the surface (and internal components housed under the surface) from physical damage. Waterproofing may further be added to the covering of the top surface 112 to combat water damage.

Conversely, rear surface 108 may be covered in a textured material in order to provide a gripping surface. However, the texture of the material may have an appearance that is unable to be replicated by hard, smooth material alone.

Figure 2:
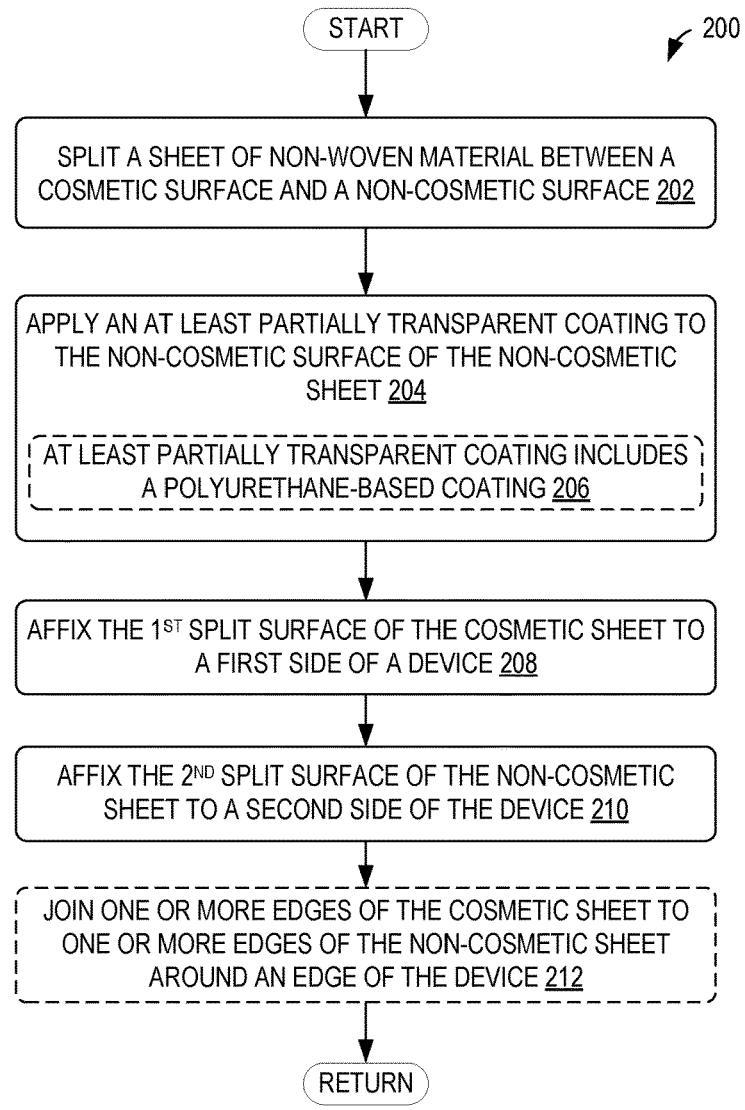
FIG. 2 is a flow chart of an example method of covering a device with non-woven material.

FIG. 2 provides a method 200 for covering a device (such as keyboard 102 of FIG. 1) such that different surfaces have different tactile properties but similar or the same appearance. Method 200 may also provide an additional benefit of reducing waste in covering manufacturing. Textured material may be manufactured as a sheet of non-woven material having a cosmetic (e.g., textured) surface and a non-cosmetic (e.g., less textured and/or smooth) surface. However, such sheets of non-woven material can be thick and can undesirably increase the overall thickness of the device being covered. Accordingly, the present disclosure is directed to a process of cutting the sheet of non-woven material into two thinner sheets, both of which can be used to cover different portions of the same device.

Figure 3:
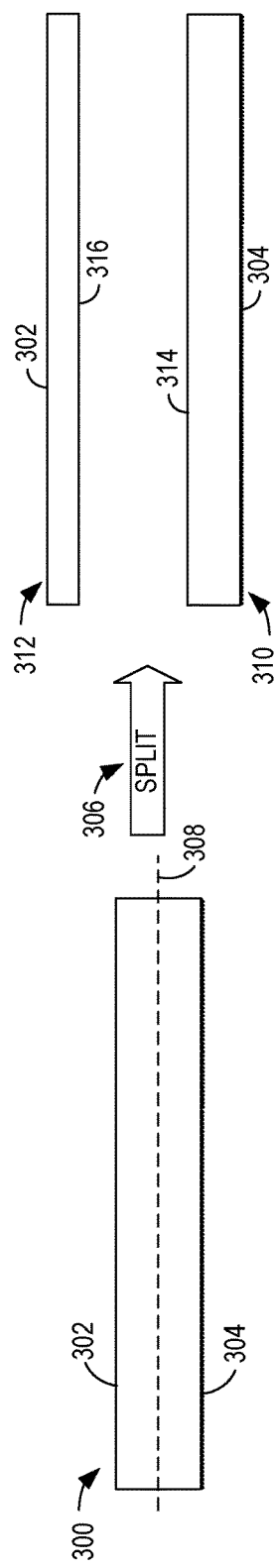
FIG. 3 is a schematic diagram illustrating an example sheet of non-woven material being split into a cosmetic sheet and a non-cosmetic sheet.

As described with reference to FIG. 2, method 200 includes splitting a sheet of non-woven material between a cosmetic surface and a non-cosmetic surface, as indicated at 202. For example, FIG. 3 shows a sheet 300 of non-woven material including a non-cosmetic surface or side 302 and a cosmetic (e.g., textured) surface or side 304 opposite of the non-cosmetic surface. Examples of non-woven material may include microfiber, leather/suede, and/or any other suitable material. In one non-limiting example, a roll of the non-woven material may have a width of 142.2 cm (+/−2.5 cm) and a length of 50 m (+/−1 m).

As indicated at 306, sheet 300 is split along a horizontal or longitudinal axis 308 (e.g., between the cosmetic surface or side 304 and the non-cosmetic surface or side 302) into a non-cosmetic sheet 312 and a cosmetic sheet 310. The cosmetic sheet 310 includes the cosmetic surface or side 304 of the sheet 300 of non-woven material, as well as a first split surface or side 314 (e.g., along which the non-woven material was split). Accordingly, the first split surface or side 314 is opposite of the cosmetic surface or side 304. The non-cosmetic sheet 312 includes the non-cosmetic surface or side 302 of the sheet 300 of non-woven material, as well as a second split surface or side 316 (e.g., along which the non-woven material was split). Accordingly, the second split surface or side 316 is opposite of the non-cosmetic surface or side 302. In this way, the cosmetic sheet and the non-cosmetic sheet are products of the same sheet of non-woven material.

In some examples, the non-cosmetic sheet may have a different thickness than the cosmetic sheet. For example, the cosmetic sheet may be thicker than the non-cosmetic sheet, as illustrated in FIG. 3. In some implementations, the cosmetic sheet may have a greater thickness than the non-cosmetic sheet in order to provide additional cushioning for the tactile experience of gripping that surface. Furthermore, as described below, the non-cosmetic sheet will have a coating applied thereto. Accordingly, the non-cosmetic sheet may be thinner in order to accommodate the additional thickness of the coating. In other examples, the non-cosmetic sheet may be the same thickness or thicker than the cosmetic sheet.

Figure 4:
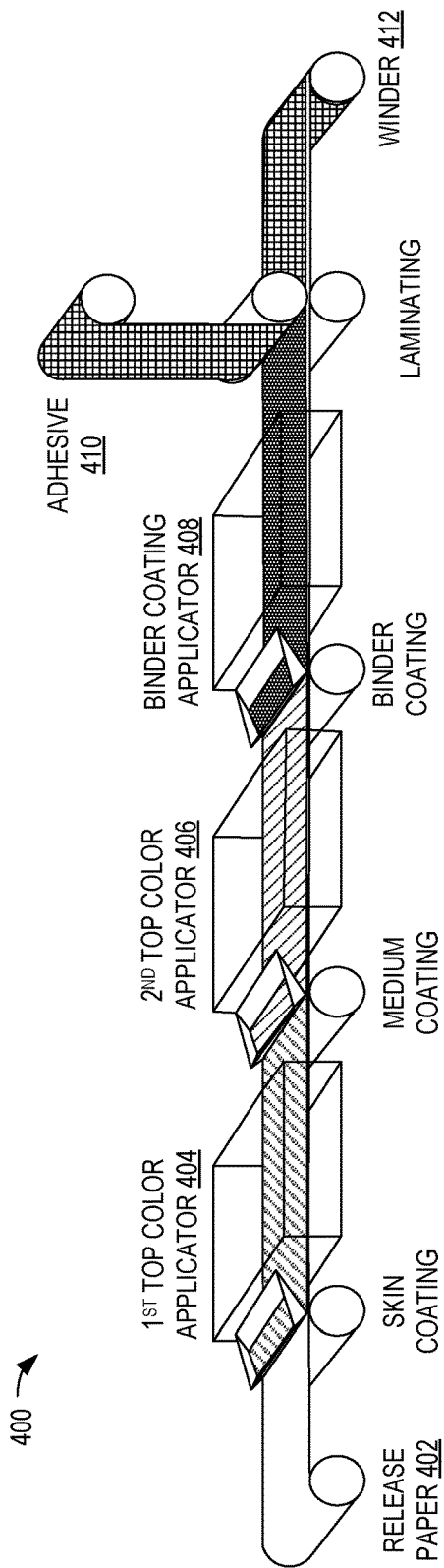
FIG. 4 shows an example process for producing an at least partially transparent coating.

Returning to FIG. 2, method 200 includes applying an at least partially transparent coating to the non-cosmetic surface of the non-cosmetic sheet, as indicated at 204. In some examples, the at least partially transparent coating may include a polyurethane-based coating, as indicated at 206. FIG. 4 shows an example process 400 for forming the at least partially transparent polyurethane-based coating. According to example process 400, a roll of release paper 402 is fed to a first top color applicator 404 to apply a skin coating to the release paper. The release paper (with the skin coating applied thereto) may optionally be fed to a second top color applicator 406 to apply a medium coating on top of the skin coating. The first and second top color applicators may be clear color applicators. Such a coating may be utilized to minimize or eliminate occlusions (e.g., as visible to the human eye) of the underlying material over which the coating is applied (e.g., the non-cosmetic sheet of the non-woven material). Although two top color applicators are shown in FIG. 4, any suitable number of color applicators may be used to form a clear color coated sheet. In the illustrated example, the first layer of clear coating may have a thickness of 30 um, and the second layer of clear coating may have a thickness of 32 um. The clear color-coated sheet may have an aromatic percentage (e.g., a percentage of aromatic compounds) of 40% and an aliphatic percentage (e.g., a percentage of aliphatic compounds) of 60%. One or more of the above-described color coatings may further include waterproofing polymers (e.g., durable water repellant), such as polytetrafluoroethylene (PTFE). As an example, 4 parts per layer (+/−0.2) of durable water repellant content may be included in the at least partially transparent coating.

The clear color-coated sheet may then be fed to a binder coating applicator 408 to form a binder-coated sheet. The binder coating applicator may apply a binder coating (e.g., adipic acid dihydrazide [ADH] in one non-limiting example) to the color-coated sheet in order to harden the coating. The binder coating may also be clear and may include special additives (e.g., 0.3 parts per layer) to make the coating heat resistant and to promote resin hardness. The aromatic percentage of the binder coating may be 10%, leaving an aliphatic percentage of 90%.

An adhesive 410, such as hot melt film (HMF), may be laminated onto the binder-coated sheet to form a laminated sheet of polyurethane-based coating (e.g., the at least partially transparent coating). The adhesive may be applied to the binder-coated sheet in order to create a surface that may be adhered (e.g., once exposed to heat) to a backing material (e.g., the non-cosmetic surface of the non-cosmetic sheet of the non-woven material). The laminated sheet of polyurethane-based coating may be rolled via a winder 412 in preparation for application to the backing material via roll-to-roll lamination.

The at least partially transparent coating may be relatively thin compared to the underlying backer material (e.g., the non-cosmetic sheet of the non-woven material). Example thicknesses may include a non-cosmetic sheet that is 350 um (+/−50 um) thick and an at least partially transparent coating that is 90 um (+/−37 um) thick. Approximately 20 um (+/−7 um) of the thickness of the at least partially transparent coating may correspond to the binder coating, whereas the remaining 70 um (+/−30 um) of thickness may correspond to the dry polyurethane-based coating (e.g., the clear color coating).

Figure 5:
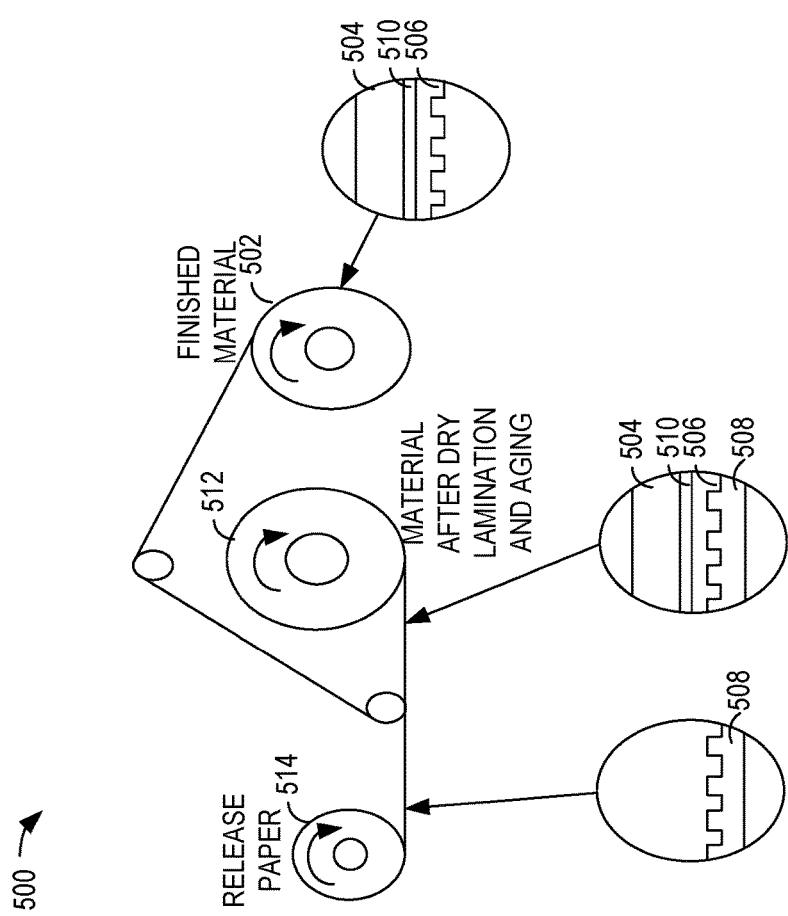
FIG. 5 shows an example process for delaminating a non-cosmetic sheet of non-woven material after applying an at least partially transparent coating to the non-cosmetic sheet.

FIG. 5 shows an example delamination process 500 to form a finished material winding 502 including the non-cosmetic sheet (base 504) of the non-woven material with the at least partially transparent coating 506 applied thereto. The at least partially transparent coating 506 may be sandwiched between release paper 508 and an adhesive layer 510. For example, the at least partially transparent coating 506 may be formed as described above with respect to FIG. 4. The at least partially transparent coating may be applied to the non-cosmetic sheet (base 504) via dry roll-to-roll lamination and aging (e.g., such that adhesive layer 510 is activated to adhere the at least partially transparent coating 506 to the non-cosmetic surface of the non-cosmetic sheet) and rolled into winding 512. In the delamination process 500, the release paper may be removed from the winding 512 and rolled into winding 514. The remaining non-cosmetic sheet (base 504), adhesive layer 510, and at least partially transparent coating 506 may then be rolled into winding 502.

Returning to FIG. 2, method 200 includes affixing the first split surface of the cosmetic sheet to a first side of a device, as indicated at 208. The method further includes affixing the second split surface of the non-cosmetic sheet to a second side of the device, as indicated at 210. In some examples, the first and second sides may be opposite one another. In other examples, the first and second sides may be perpendicular to one another or otherwise different sides of the device. In still other examples, the first and second sides may be different regions of the device, which may occupy the same face or surface of the device.

Figure 6:
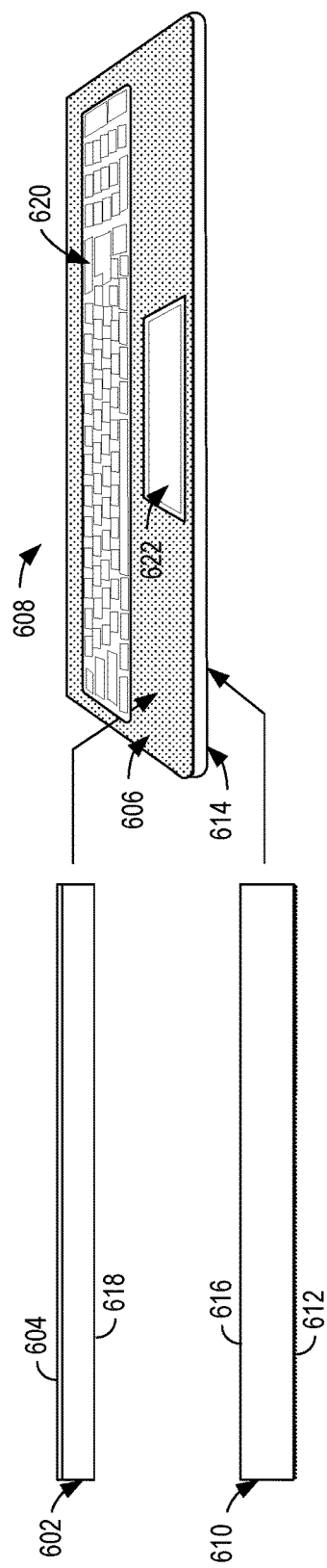
FIG. 6 schematically shows split non-woven material for affixing to surfaces of a device.

FIG. 6 shows an example in which split material is applied to opposite sides of a device. In FIG. 6, a non-cosmetic sheet 602, with an at least partially transparent coating 604 applied to a non-cosmetic surface of the sheet, is affixed to a portion 606 (e.g., indicated by the dotted pattern) of the top of the device framing a keyboard 608. A cosmetic sheet 610, with a cosmetic (e.g., textured) surface 612, is applied to a bottom 614 of the device. The cosmetic sheet 610 and the non-cosmetic sheet 602 may be split from a sheet of non-woven material along first and second split surfaces 616 and 618, respectively. The sheets may be affixed to the device such that the respective split surfaces contact the respective sides of the device (e.g., where the first split surface 616 contacts the bottom 614 and the second split surface 618 contacts the portion 606). Cosmetic and non-cosmetic sheets 610 and 602 may be examples of cosmetic and non-cosmetic sheets 310 and 312 of FIG. 3. As illustrated, the non-cosmetic sheet 602 may frame keys 620 of the keyboard 608, as well as a touch pad 622 of the keyboard 608.

Figure 7:
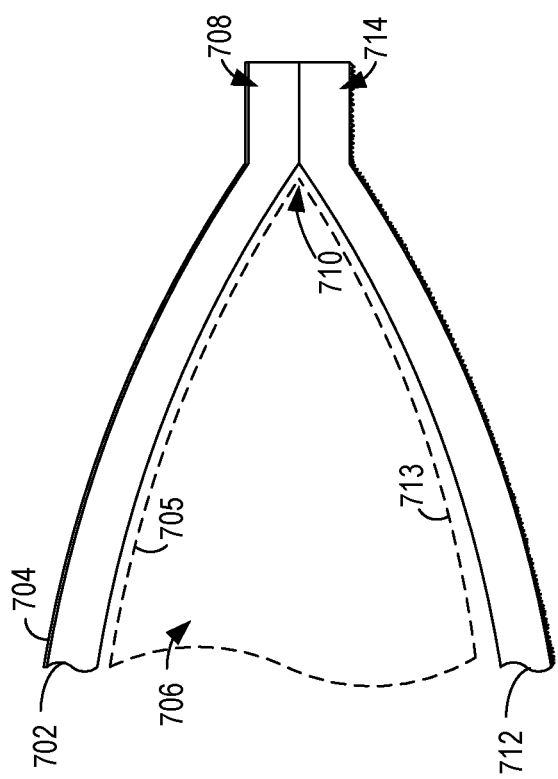
FIG. 7 shows joining ends of non-woven material around an edge of an example device.

Returning to FIG. 2, method 200 may optionally include joining one or more edges of the cosmetic sheet to one or more edges of the non-cosmetic sheet around an edge of the device, as indicated at 222. FIG. 7 illustrates an example of joining such edges. As shown in FIG. 7, a non-cosmetic sheet 702 (e.g., an example of non-cosmetic sheet 312 of FIG. 2) with an at least partially transparent coating 704 applied to a non-cosmetic (e.g., outer) surface of the sheet may be affixed to a first surface 705 of a device 706 such that an edge 708 of the non-cosmetic sheet extends past an edge 710 of the device. Likewise, a cosmetic sheet 712 (e.g., an example of cosmetic sheet 310 of FIG. 3) may be affixed to a second surface 713 of the device 706 such that an edge 714 of the cosmetic sheet extends past the edge 710 of the device. In some examples, surfaces 705 and 713 may include a housing of the device 706, and electrical or other device components of device 706 may be enclosed within the housing (e.g., between surfaces 705 and 713). In additional or alternative examples, surface 705 and/or 713 may correspond to surfaces of electrical or other device components of device 706, such that the cosmetic and non-cosmetic sheets are affixed directly to such electrical or other device components. For example, where the device 706 corresponds to a keyboard, the device components may include a composite plastic board for stiffening and keyboard mechanics and electronics.

The edges 708 and 714 may be joined in any suitable manner, including stitching, adhering/gluing, clamping, stapling, and/or other mechanisms for affixing the edges together. As illustrated, the edges 708 and 714 may be joined such that split surfaces of the cosmetic and non-cosmetic sheets are in contact with one another.

According to the above disclosure, a covering may be formed that maintains a uniform appearance while providing different tactile experiences in different regions of a covered device. Further, material waste may be reduced (relative to thin coverings that only utilize cosmetic surfaces of a non-woven material) by splitting a single sheet of non-woven material and utilizing each of the resulting sheets for the covering. The non-cosmetic surface of the non-cosmetic sheet may be visually similar to the cosmetic surface of the cosmetic sheet. Accordingly, since the non-cosmetic surface is not able to provide the tactile features of the cosmetic surface, the non-cosmetic surface may be coated with a clear, hard coating to provide a different tactile feature with a similar visual appearance. Covering or wrapping a device with the cosmetic and (coated) non-cosmetic sheets utilizes the full thickness of the non-woven material to provide different types of coverings with a uniform appearance.

Another example provides for a method of covering a device, the method including splitting a sheet of non-woven material between a cosmetic surface of the non-woven material and a non-cosmetic surface of the non-woven material to produce: a cosmetic sheet of the non-woven material including the cosmetic surface and a first split surface opposite the cosmetic surface, and a non-cosmetic sheet of the non-woven material including the non-cosmetic surface and a second split surface opposite the non-cosmetic surface, applying an at least partially transparent coating to the non-cosmetic surface of the non-cosmetic sheet, affixing the first split surface of the cosmetic sheet to a first side of the device, and affixing the second split surface of the non-cosmetic sheet to a second side of the device. Such an example may additionally or alternatively further include joining one or more edges of the cosmetic sheet to one or more edges of the non-cosmetic sheet around an edge of the device. Such an example may additionally or alternatively include the method wherein the at least partially transparent coating comprises a polyurethane-based coating. Such an example may additionally or alternatively include forming the polyurethane-based coating by: applying at least one clear color coating to a sheet of release paper to form a clear color-coated sheet, applying a binder coating to the clear color-coated sheet of release paper to form a binder-coated sheet, and laminating a hot melt film to the binder-coated sheet to form a laminated sheet of polyurethane-based coating. Such an example may additionally or alternatively include the method wherein applying the at least partially transparent coating to the non-cosmetic surface of the non-cosmetic sheet comprises roll-to-roll laminating the laminated sheet of clear polyurethane-based coating to the non-cosmetic surface of the non-cosmetic sheet. Such an example may additionally or alternatively include the method wherein the binder coating comprises an adipic acid dihydrazide (ADH)-based coating with an aromatic percentage of 10% and an aliphatic percentage of 90%. Such an example may additionally or alternatively include the method wherein the at least one clear color coating comprises an aromatic percentage of 40% and an aliphatic percentage of 60%. Such an example may additionally or alternatively include the method wherein the non-woven material comprises a microfiber sheet. Any or all of the above-described examples may be combined in any suitable manner in various implementations.

Another example provides for a device, including a housing having a first side and a second side, a cosmetic sheet of a non-woven material affixed to at least a portion of the first side of the housing at a first split side of the cosmetic sheet of the non-woven material, a non-cosmetic sheet of the non-woven material affixed to at least a portion of the second side of the housing at a second split side of the non-cosmetic sheet of the non-woven material, and an at least partially transparent coating applied to a non-cosmetic side of the non-cosmetic sheet, the non-cosmetic side of the non-cosmetic sheet being opposite the second split side of the non-cosmetic sheet. Such an example may additionally or alternatively include the device wherein the cosmetic sheet and the non-cosmetic sheet are split from the non-woven material, the non-cosmetic side of the non-cosmetic sheet corresponding to a non-cosmetic surface of the non-woven material and the cosmetic side of the cosmetic sheet corresponding to a cosmetic surface of the non-woven material. Such an example may additionally or alternatively include the device wherein the non-woven material comprises a microfiber fabric. Such an example may additionally or alternatively include the device wherein the cosmetic sheet and the non-cosmetic sheet have different thicknesses. Such an example may additionally or alternatively include the device wherein the non-cosmetic sheet is thinner than the cosmetic sheet. Such an example may additionally or alternatively include the device wherein the at least partially transparent coating comprises an optically clear polyurethane coating. Such an example may additionally or alternatively include the device wherein at least a portion of an edge of the cosmetic sheet is joined to at least a portion of an edge of the non-cosmetic sheet around an edge of the housing. Any or all of the above-described examples may be combined in any suitable manner in various implementations.

Another example provides for a keyboard including a housing having a first side and a second side, the first side corresponding to a bottom of the keyboard and the second side corresponding to a top of the keyboard and framing keys of the keyboard, a cosmetic sheet of a non-woven material affixed to the first side of the housing at a first split side of the cosmetic sheet of the non-woven material, a non-cosmetic sheet of the non-woven material affixed to at least a portion of the second side of the housing at a second split side of the non-cosmetic sheet of the non-woven material, and an at least partially transparent coating applied to a non-cosmetic side of the non-cosmetic sheet, the non-cosmetic side of the non-cosmetic sheet being opposite the second split side of the non-cosmetic sheet. Such an example may additionally or alternatively include the keyboard wherein the cosmetic sheet and the non-cosmetic sheet are split from the non-woven material, the non-cosmetic side of the non-cosmetic sheet corresponding to a non-cosmetic surface of the non-woven material and the cosmetic side of the cosmetic sheet corresponding to a cosmetic surface of the non-woven material. Such an example may additionally or alternatively include the keyboard wherein at least a portion of an edge of the cosmetic sheet is joined to at least a portion of an edge of the non-cosmetic sheet around an edge of the housing, and wherein one or more of electrical and mechanical components of the keyboard are housed within the housing and between the cosmetic sheet and the non-cosmetic sheet. Such an example may additionally or alternatively include the keyboard wherein the at least partially transparent coating comprises an optically clear polyurethane coating and wherein the non-woven material comprises a microfiber sheet. Such an example may additionally or alternatively include the keyboard wherein the non-cosmetic sheet extends around and frames a touchpad positioned below the keys of the keyboard. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of covering a device, the method comprising:
   splitting a sheet of non-woven material between a cosmetic surface of the non-woven material and a non-cosmetic surface of the non-woven material to produce:
      a cosmetic sheet of the non-woven material including the cosmetic surface and a first split surface opposite the cosmetic surface, and
      a non-cosmetic sheet of the non-woven material including the non-cosmetic surface and a second split surface opposite the non-cosmetic surface;
   applying an at least partially transparent coating to the non-cosmetic surface of the non-cosmetic sheet;
   affixing the first split surface of the cosmetic sheet to a first side of the device; and
   affixing the second split surface of the non-cosmetic sheet to a second side of the device.

2. The method of claim 1, further comprising joining one or more edges of the cosmetic sheet to one or more edges of the non-cosmetic sheet around an edge of the device.

3. The method of claim 1, wherein the at least partially transparent coating comprises a polyurethane-based coating.

4. The method of claim 3, further comprising forming the polyurethane-based coating by:
   applying at least one clear color coating to a sheet of release paper to form a clear color-coated sheet;
   applying a binder coating to the clear color-coated sheet of release paper to form a binder-coated sheet; and
   laminating a hot melt film to the binder-coated sheet to form a laminated sheet of polyurethane-based coating.

5. The method of claim 4, wherein applying the at least partially transparent coating to the non-cosmetic surface of the non-cosmetic sheet comprises roll-to-roll laminating the laminated sheet of clear polyurethane-based coating to the non-cosmetic surface of the non-cosmetic sheet.

6. The method of claim 4, wherein the binder coating comprises an adipic acid dihydrazide (ADH)-based coating with an aromatic percentage of 10% and an aliphatic percentage of 90%.

7. The method of claim 4, wherein the at least one clear color coating comprises an aromatic percentage of 40% and an aliphatic percentage of 60%.

8. The method of claim 1, wherein the non-woven material comprises a microfiber sheet.

9. A device, comprising:
   a housing having a first side and a second side;
   a cosmetic sheet of a non-woven material affixed to at least a portion of the first side of the housing at a first split side of the cosmetic sheet of the non-woven material;
   a non-cosmetic sheet of the non-woven material affixed to at least a portion of the second side of the housing at a second split side of the non-cosmetic sheet of the non-woven material; and
   an at least partially transparent coating applied to a non-cosmetic side of the non-cosmetic sheet, the non-cosmetic side of the non-cosmetic sheet being opposite the second split side of the non-cosmetic sheet.

10. The device of claim 9, wherein the cosmetic sheet and the non-cosmetic sheet are split from the non-woven material, the non-cosmetic side of the non-cosmetic sheet corresponding to a non-cosmetic surface of the non-woven material and the cosmetic side of the cosmetic sheet corresponding to a cosmetic surface of the non-woven material.

11. The device of claim 10, wherein the non-woven material comprises a microfiber fabric.

12. The device of claim 11, wherein the cosmetic sheet and the non-cosmetic sheet have different thicknesses.

13. The device of claim 12, wherein the non-cosmetic sheet is thinner than the cosmetic sheet.

14. The device of claim 9, wherein the at least partially transparent coating comprises an optically clear polyurethane coating.

15. The device of claim 9, wherein at least a portion of an edge of the cosmetic sheet is joined to at least a portion of an edge of the non-cosmetic sheet around an edge of the housing.

16. A keyboard comprising:
a housing having a first side and a second side, the first side corresponding to a bottom of the keyboard and the second side corresponding to a top of the keyboard and framing keys of the keyboard;
a cosmetic sheet of a non-woven material affixed to the first side of the housing at a first split side of the cosmetic sheet of the non-woven material;
a non-cosmetic sheet of the non-woven material affixed to at least a portion of the second side of the housing at a second split side of the non-cosmetic sheet of the non-woven material; and
an at least partially transparent coating applied to a non-cosmetic side of the non-cosmetic sheet, the non-cosmetic side of the non-cosmetic sheet being opposite the second split side of the non-cosmetic sheet.

17. The keyboard of claim 16, wherein the cosmetic sheet and the non-cosmetic sheet are split from the non-woven material, the non-cosmetic side of the non-cosmetic sheet corresponding to a non-cosmetic surface of the non-woven material and the cosmetic side of the cosmetic sheet corresponding to a cosmetic surface of the non-woven material.

18. The keyboard of claim 16, wherein at least a portion of an edge of the cosmetic sheet is joined to at least a portion of an edge of the non-cosmetic sheet around an edge of the housing, and wherein one or more of electrical and mechanical components of the keyboard are housed within the housing and between the cosmetic sheet and the non-cosmetic sheet.

19. The keyboard of claim 16, wherein the at least partially transparent coating comprises an optically clear polyurethane coating and wherein the non-woven material comprises a microfiber sheet.

20. The keyboard of claim 16, wherein the non-cosmetic sheet extends around and frames a touchpad positioned below the keys of the keyboard.

* * * * *